Jan. 5, 1965   R. G. SCHMID   3,164,127
PORTABLE HAND-HELD SIGNAL GENERATOR
Filed Feb. 2, 1962   3 Sheets-Sheet 1
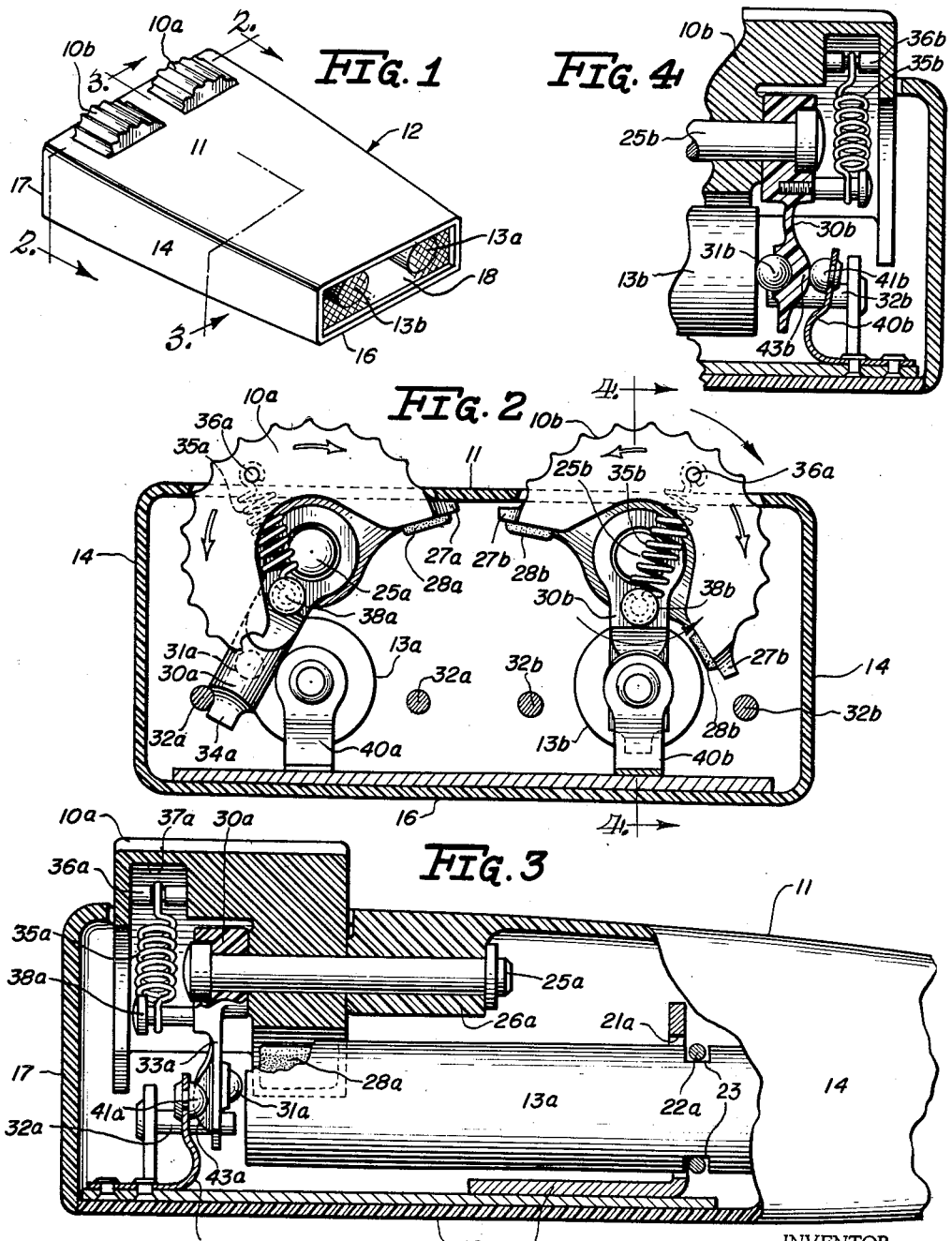
INVENTOR.
Richard G. Schmid
BY
Francis W. Crotty
Atty.

Jan. 5, 1965  R. G. SCHMID  3,164,127
PORTABLE HAND-HELD SIGNAL GENERATOR
Filed Feb. 2, 1962  3 Sheets-Sheet 2

INVENTOR.
Richard G. Schmid
BY
Francis W. Crotty
Atty.

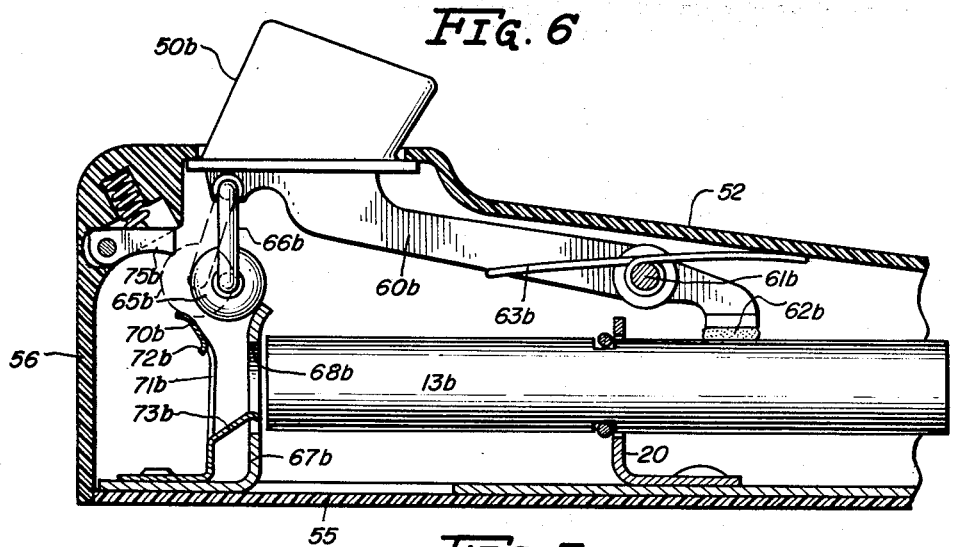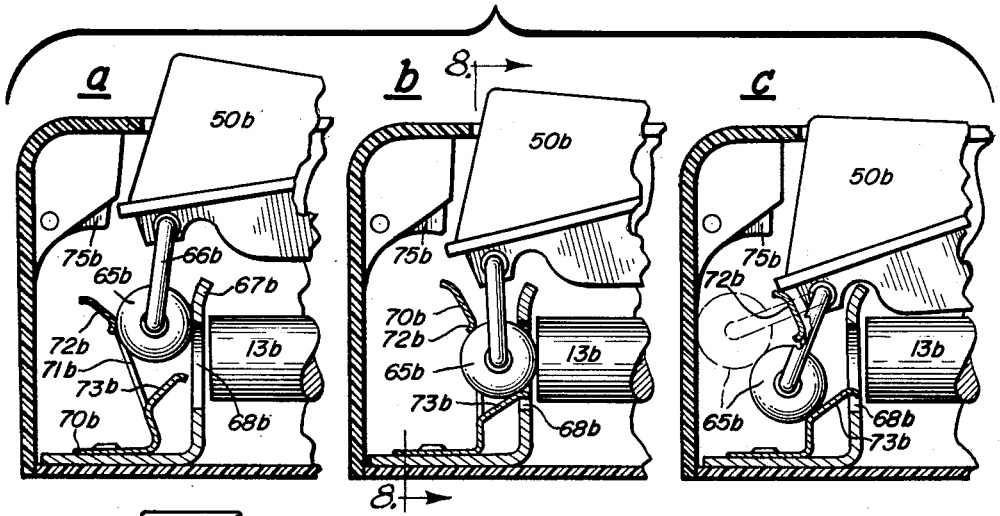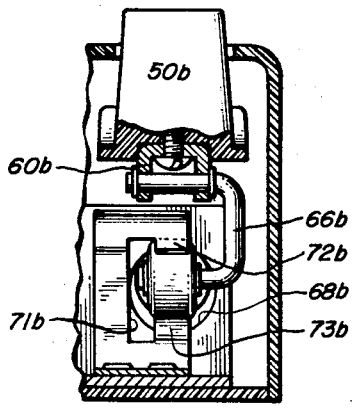

United States Patent Office 3,164,127
Patented Jan. 5, 1965

3,164,127
PORTABLE HAND-HELD SIGNAL GENERATOR
Richard G. Schmid, Norridge, Ill., assignor to Zenith Radio Corporation, Chicago, Ill., a corporation of Delaware
Filed Feb. 2, 1962, Ser. No. 170,690
17 Claims. (Cl. 116—137)

The present invention relates to a signal generator of the type using a mechanical resonator element to generate a signal of a predetermined frequency, preferably above the normal sonic range. More particularly, it relates to such a transmitter featuring a new mechanism for imparting mechanical energy to the resonator element.

Ultrasonic transmitters of the type under consideration are especially adapted for use in remote control systems employed in the television art. An example of such a transmitter is described and claimed in Patent 2,821,955, Ehlers et al., which is assigned to the present assignee. Several similar transmitters operating on the same principle have been used throughout the television industry for remote control purposes.

It is an object of the present invention to provide a novel signal generator of the type using a mechanical resonator element.

It is a more specific object of this invention to provide an ultrasonic signal generator of improved efficiency.

A portable hand-held signal generator constructed in accordance with the invention comprises a vibrator rod having a central axis and an end face. A mechanical exciter is movable between an operative position where it is aligned with the axis of the rod and a second position where the exciter is transversely displaced from the rod axis. Actuating means are provided for moving the exciter in a path transverse to the rod axis, the path including the operative position of the exciter and its second position. Finally means are provided for urging the exciter toward the end face of the rod in a direction longitudinally of the rod axis to cause the exciter to impact the end face of the rod only when the exciter is in its operative position.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a perspective view of an ultrasonic transmitter constructed in accordance with the present invention;

FIGURE 2 is an enlarged sectional view taken along line 2—2 of FIGURE 1;

FIGURE 3 is an enlarged sectional view, partially cut away, taken along line 3—3 of FIGURE 1;

FIGURE 4 is a partial sectional view taken along line 4—4 of FIGURE 2;

FIGURE 6 is an enlarged partial sectional view taken along line 6—6 of FIGURE 5;

FIGURE 7 is a portion of FIGURE 6 showing its mechanism in three different operating positions;

FIGURE 8 is a partial sectional view taken along line 8—8 of FIGURE 7b;

Figure 5:
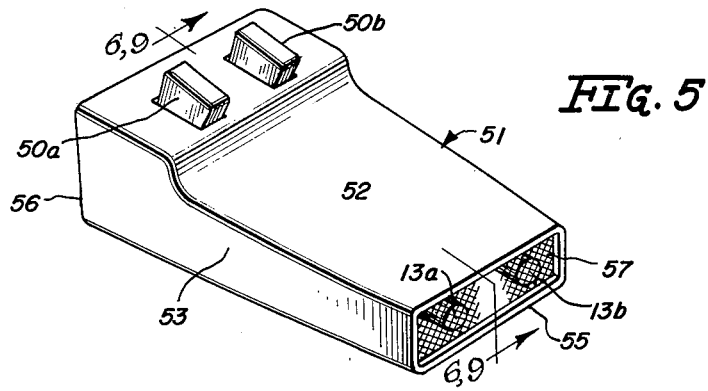
FIGURE 5 is a perspective view of an ultrasonic transmitter which includes a transmitter mechanism constructed in accordance with either the embodiments of FIGURES 6–8 or FIGURES 9–10.

The ultrasonic transmitters shown in FIGURES 1 and 5 are capable of controlling several operating characteristics of a television receiver. They are of such a size and weight as to be conveniently portable and hand-held by the user and include two ultrasonic signal generators of similar construction. The components of the individual generators are distinguished from one another by suffixes *a* and *b*. Referring now to the embodiment illustrated in FIGURES 1–4 each generator has a rotary actuator knob identified individually in FIGURE 1 by reference characters 10*a* and 10*b*. The knobs extend through a top portion 11 of a housing 12. Each rotary actuator is associated with a vibrator rod 13*a* or 13*b* constructed of aluminum or other metal having a suitable mechanical Q or ring time to serve as a longitudinal mode vibrator. The user may selectively actuate or set into vibration any one of the rods by rotating the actuator associated with that rod.

When a signal is generated in response to the user's rotating an actuator, the signal transmitted has a frequency determined by the rod that has been set into vibration and the remotely controlled television receiver is equipped with a receiving arrangement to receive and utilize this signal. A very successful remote control receiving system, featuring the use of a multiplicity of command signals distinguished from one another on the basis of the frequency of the transmitted energy is the subject of United States Letters Patent No. 2,817,025, issued on December 17, 1957, in the name of Robert Adler and assigned to the same assignee as the present invention. As there described, the controlled functions of the television receiver are on-off switching, channel selection, and sound muting. Channel selection is achieved by appropriate energization of a bidirectional motor which drives a turret type tuner in either clockwise or counter-clockwise direction. Since four separate and distinct functions are contemplated, the arrangement requires a companion transmitter capable of generating four different command signals, two to permit control of the tuning motor in each of two directions and one each for the on-off and sound muting. The transmitter shown in FIGURES 1–4 may be utilized for a similar remote control system modified to require only two different command signals; for example, one controlled characteristic could be a combined on-off mute switch and the other one way tuning. Of course, the transmitter may have as many rods and actuators as the installation requires.

The command signals generated take the form of bursts or pulses of acoustical energy generated and transmitted upon the actuation of ultrasonic vibrator rods 13*a*, 13*b*. The length of each vibrator, in combination with the velocity of signal propagation therein, determines the signal frequency resulting from its being excited.

Transmitter housing 12 includes in addition to front panel 11, two side portions 14, a bottom panel 16, a back panel 17 and a wire mesh 18 placed in front of the vibrator rods and serving as a sound outlet. The mesh is retained in position by engagement with top panel 11, side portions 14 and bottom panel 16. Since the ultrasonic command signal generated by any vibrator rod must pass through this screen, the spacing of the grid elements forming the screen is chosen for minimum signal attenuation for the band of ultrasonic signals to be used in the remote control system. In the system disclosed in the Alder patent it has been found expedient to use an ultrasonic frequency band centered at approximately 40 kilocycles.

Vibrator rods 13*a* and 13*b* are mounted, as shown in FIGURE 3, by means of a support assembly 20 which is affixed to bottom panel 16 of housing 12. Rod 13*a* extends through an aperture 21*a* in the support assembly and is centered in the aperture by means of a U-shaped spring wire 22a which passes through space opposed slots 23 milled in the rod. Each rod is securely held at its nodal plane located approximately midway between two ends of the rod and the wire-spring mounting at the nodal plane allows full freedom of vibration while at the same time holding the rod firmly against dislodgment even though it is excited by a hammer or similar blow applied at one end face and along the axial direction of the rod. The details of such a spring wire mount at a nodal plane are fully described and claimed in Patent 2,821,956, by O. E. Wold, assigned to the present assignee.

Each rotary actuator 10a, 10b is a sector of a solid cylinder subtending an angle of approximately 120°. The actuator knobs are mounted on shafts 25a and 25b at their central axes as shown in FIGURES 2 and 3, the shafts being journalled in bearing portions 26a and 26b of top panel 11. Actuators 10a and 10b are freely rotatable about the axis of shafts 25a and 25b and are limited in their rotation by a pair of stop abutments 27a and 27b as best shown in FIGURE 2. The abutments are radial protrusions of actuators 10a and 10b which engage the bottom surface of top panel 11 on either side of the panel opening through which the actuators project. (One of the stop abutments of actuator 10a is not shown.) The radial protrusions of actuators 10a and 10b also have affixed to them damping pads 28a and 28b composed of a resilient substance such as cork or rubber and having an arcuate path of movement which intersects the side surface of rods 13a and 13b. A more detailed explanation of the action of damping pads 28a and 28b will be given below in describing the operation of the device.

In addition to actuators 10a and 10b, follower arms 30a and 30b are mounted for rotation about shafts 25a and 25b. As best shown in FIGURE 3, arm 30a retains a metal ball 31a at its free end which has an arc of movement about shaft 25a intersecting the longitudinal axis of rod 13a. More specifically, ball 31a serves as a mechanical exciter for rod 13a the operation of which will be discussed in detail below. Arm 30a has a necked down flexible portion 33a which normally spaces exciter 31a a predetermined distance in the axial direction away from the end face of rod 13a but has sufficient flexibility to allow the exciter to be moved into contact with the rod. Arm 30a is limited in its rotary movement to an arc of approximately 30° between two rest or second positions by a pair of stops 32a which extend from bottom panel 16. For example, in FIGURE 2 a tab 34a located at the radial extremity of arm 30a is shown engaging stop 32a.

Referring now for convenience to a single generator assembly, actuating means for moving exciter 31a with a component of motion transverse to the vibrator rod includes, in addition to follower arm 30a and rotary actuator 10a, a coil spring 35a which is tied between a pin 36a retained in a cavity 37a in actuator 10a on one end and on the other end is retained by a stud 38 extending from follower arm 30a. As shown in FIGURE 2, the tension force of spring 35a biases actuator 10a in a counter-clockwise direction with abutment 27a contacting top panel 11 and biases follower arm 30a in a clockwise direction, with tab 34a of the arm biased against stop 32a. As actuator 10a is rotated clockwise to its maximum limit, which is determined by stop abutment 27a, the bias of spring 335a is reversed and follower arm 30a then rests against the opposite stop 32a. The movement of arm 30a in response to movement of knob 10a is due to the over-center feature of the actuating structure; i.e. when the force vector of spring 35a passes through a line connecting the two end terminations of spring 35a and the center of rotation of arm 30a and knob 10a, the radial bias force on arm 30a reverses and swings the arm to its opposite stop. In FIGURE 2 spring 35b is shown as just having passed its center position and therefore arm 22b is in the process of moving in the direction shown by the arrow to its opposite stop. Exciter 31b in FIGURE 2 is substantially aligned with the axis of rod 13a which is the exciter's operative position.

Means responsive to the transverse motion of exciters 31a and 31b impart to the exciters a component of motion in a direction parallel to the rod. This means include a flexible spring member 40a as best shown in FIGURE 3 which has an L configuration, one side of the L being affixed to bottom panel 16 and the other side having a bulbar portion 41a spaced a predetermined axial distance from the end of rod 13a. Follower arm 30a includes a curved cam portion 43a which is located in opposed relation to exciter 31a and has a path of movement such that its cam surface engages bulbar portion 41a. The distance from the portion of cam 433a which engages bulbar portion 41a to the outer most extremity of exciter 31a is greater than the distance of bulbar portion 41a from the end of rod 13a. Thus, as illustrated in FIGURE 4, when exciter 31b is in its operative position aligned with the axis of rod 13b spring member 40b engages cam portion 43b to push and deflect the exciter from its transverse path of movement against the rod in a direction parallel to the rod axis.

*Operation*

Each rotary actuator knob of the transmitter bears a suitable legend identifying the particular function of the controlled receiver which may be accomplished by actuating that actuator. When the user wishes to control that function, he rotates the control knob 10a, for example. As the knob is rotated, spring 35a is shifted toward an over-center position and as it reaches this position follower arm 30a is moved from a second or rest position toward its operative position when mechanical exciter 31a is aligned with the axis of rod 13a. Movement of follower arm 30a toward the operative position engages cam surface 43a with bulbar portion 41a and deflects the exciter from its normal path of motion into impact with the end face of rod 13a as the exciter reaches its operative position. Rod 13a is thus set into vibration and the desired control function is accomplished. The bias force of spring 35a continues to move exciter 31a past its operative position, allowing the exciter and follower arm to move to their second position with tab 34a resting against a stop 32a.

Since the exciter is rapidly moved past the rod only one impact with the rod is allowed thereby preventing an undesirable double impact which decreases the output signal of the rod.

When the user completes his rotation of knob 10 to its opposite position, damper 28a engages the rod to stop any further vibration. Conversely, as knob 10a is first actuated by the user the damping pad is immediately moved away from impact with the rod to allow vibration of the rod at the signal frequency.

Turning now to FIGURES 5 through 8, FIGURE 5 shows an ultrasonic transmitter similar to that of FIGURE 1 but having push button actuators 50a and 50b instead of rotary actuators. Ultrasonic signal generators 13a and 13b, in the form of rod-type longitudinal mode transducers, are contained in a housing 51 which includes a front panel 52 through which push buttons 50a and 50b extend, two side portions 53, a bottom panel 55, a back panel 56 and a wire mesh 57 placed in front of vibrator rods 13a and 13b. Rods 13a and 13b and their support assembly are identical to those of the first-described embodiment.

Referring now for convenience to a single generator assembly, push button 50b is mounted on one end of a lever 60b which is pivoted on a pin 61b fastened to transmitter housing 51. The other end of lever 60b retains a damping pad 62b which is normally in engagement with the side of rod 13b to damp any vibration therein. A spring 63b is wound around pin 61b and biases lever 60b in a clockwise direction to place button 50b in its maximum extended position with the flange on the button engaging the bottom of top panel 52. A mechanical exciter is coupled to lever 60b and comprises a cylindrical roller 65b which is journalled on a leg of a U-shaped carriage 66b having its other leg journalled in lever 60b at the extremity which also carries button 50b.

Guide means are provided for retaining exciter 65b in a path transverse to the axis of rod 13b and includes a rigid guide member 67b of L-shaped configuration. One leg of the L is affixed to bottom panel 55 and the other leg is perpendicular to the axis of rod 13b and has an aperture 68b substantially concentric with rod 13b. Aperture 68b is adjacent the end face of the rod and is of sufficient size to accommodate exciter 65b, providing access for the exciter to the rod. The other guide for exciter 65b is flexible member 70b which is also of an L-shaped configuration having one leg affixed to bottom panel 55. Its other leg has a C-shaped aperture 71b, as best shown in FIGURE 8, with ends 72b and 73b defining a vertical space substantially coincident with aperture 68b and rod 13b and slightly smaller than the diameter of exciter 65b. Termination 72b is spaced from leg 67b a distance less than the diameter of exciter 65b and constitutes a cam surface for deflecting exciter 65b, on its descent, into aperture 68b. Termination 73b is bent to present to vertically descending exciter 65b an inclined plane which cams the exciter away from the rod.

The upper most end of flexible guide 70b is spaced from a pivoted stop member 75b which is spring biased toward guide 70b a distance less than the diameter of exciter 65b as illustrated by the dashed outline of 65b. However, exciter 65b may be pulled through the opening between stop 75b and leg 70b from the opposite side because of the flexibility of stop member 75b and guide 70b.

Operation

Mechanical exciter 65b is movable between an operative position where it is aligned with the axis of rod 13b and a second position when the exciter is displaced transversely of the rod axis. The second or rest position is shown in FIGURE 6 with lever 60b being biased toward its maximum clockwise position. Actuating means for moving the exciter from its rest or second position to its operative position includes push button 50b. When the user depresses button 50b, exciter 65b is first moved into the guide channel provided by flexible guide 70b and rigid member 67b as shown in FIGURE 7a. Guide 70b reacts by setting up a bias on exciter 65b toward rod 13b. However, as shown in FIGURE 7a, exciter 65b is kept out of contact with rod 13b by means of rigid guide member 67b. Further displacement of button 50b by the user moves the exciter to its operative position where it is aligned with the axis of rod 13b as shown in FIGURE 7b. As the exciter reaches its operative position, it is propelled by the bias force of flexible guide member 70b through aperture 68b into impact with rod 13b thereby setting the rod into vibration. Continued depression of button 50b by the user forces exciter 65b against termination 73b which cams exciter 65b away from rod 13b as shown in FIGURE 7c, thereby allowing the rod to vibrate freely. As the user releases button 50b, exciter 65b moves to its dashed line position in FIGURE 7c and is finally forced past stop 75b by means of the upward bias of spring 63b on lever 60b.

Thus, guide members 70b and 67b comprise means responsive to the transverse motion of exciter 65b to deflect the exciter into impact with rod 13b as the exciter reaches its operative position.

Damping pad 62b on the end of lever 60b damps out any remaining vibration of the rod when lever 60b reaches its rest or maximum clockwise position.

Figure 9:
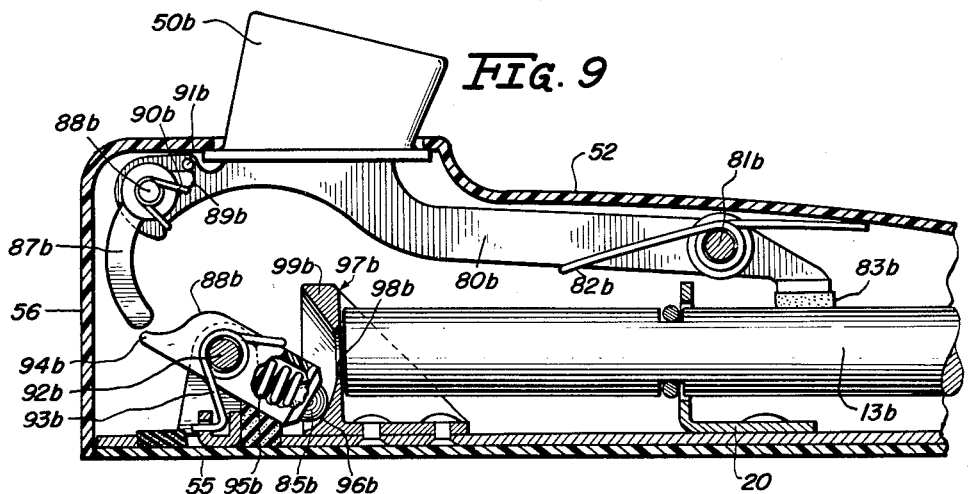
FIGURE 9 is an enlarged partial sectional view taken along line 9—9 of FIGURE 5.
Figure 10:
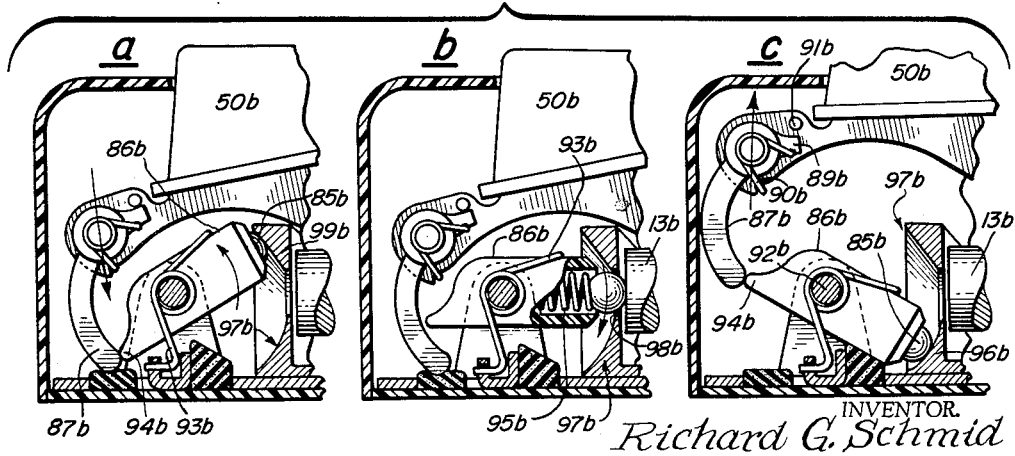
FIGURE 10 is a portion of FIGURE 9 showing its mechanism in three different operating positions.

Referring now to the embodiment shown in FIGURES 9 and 10, button 50b is affixed to one end of a lever 80b which is pivoted on a pin 81b affixed to housing 51. The lever is biased by a spring 82b in a clockwise direction and is limited in rotation by a flanged bottom portion of button 50b abutting against top panel 52 and a damping pad 83b abutting rod 13b. The mounting of rod 13b is identical to the previous mountings discussed. A metal ball 85b which acts as an exciter for rod 13b is housed in a cylindrical hollow guide member 86b and is movable between an operative position where it is aligned with the axis of rod 13b and a second or rest position where it is displaced transversely from the axis of the rod as illustrated in FIGURE 9.

Actuating means for moving exciter 85b between its operative position and its second position with a component of motion transverse to rod 13b includes an arm 87b pivotally mounted on a shaft 88b extending from an end portion 89b of lever 80b, the arm normally being biased by a spring 90b in a counter-clockwise direction against a stop pin 91b. Guide member 86b is pivotally mounted on a shaft 92b, which is in turn mounted on bottom panel 55, and is normally biased by a spring 93b in a clockwise direction. Guide member 86b has an end portion 94b which extends in the path of movement of lever 87b when lever 80b is rotated about pin 81 by actuation of push button 50b.

Spring means are provided for biasing exciter 85b towards rod 13b in a direction parallel to the axis of the rod when exciter 85b is in its operative position and includes a coiled spring 95b housed inside of hollow guide member 86b. Spring 95b has one end abutting guide member 86b and the other end engaging exciter 85b. As shown in FIGURE 9, a bottom portion 96b of a block 97b having a concave face resists the bias force of spring 95b retaining exciter 85b within guide member 86b.

Means are mounted on bottom panel 55 for storing energy in spring 95b when the exciter is in a second position and include a top portion 99b of block 97b. As shown in FIGURE 10a, top portion 99b retains exciter 85b in guide member 86b to depress spring 95b thus storing energy in the spring. Block 97b also includes a center aperture 98b which coincides with the end face of rod 13b and is of a larger diameter than that of exciter 85b to give it access to the rod.

Operation

Actuation of push button 50b by the user moves lever 87b into engagement with guide member 86b rotating the guide member in a counter-clockwise direction to the position shown in FIGURE 10a where exciter 85b is in contact with the top portion 99b of concave block 97b and spring 95b is depressed. Since end portion 94b of guide member 86b has a highly curved path of movement compared to lever 87b, end portion 94b moves out of engagement with lever 87b allowing guide member 86b to be rotated in a clockwise direction under the bias of spring 93b. This stored energy of springs 95 is released to propel exciter 85b into impact with rod 13b, as shown in FIGURE 10b, when the exciter is moved to its operative position aligned with the axis of rod 13b and centered in aperture 98b of concave block 97b. Continued movement of guide member 86b is shown in FIGURE 10c displaces exciter 85b transversely from the axis of rod 13b and moves exciter 85b into contact with bottom portion 96b of concavity 97b thereby preventing any multiple impact of the rod with the exciter.

When the user releases button 50b, lever 87b is rotated in a clockwise direction to bypass end portion 94b and as the push button reaches its fully extended position from front panel 52 damping pad 83b damps any remaining vibrations of the rod.

Thus the invention as described in its three embodiments provides an ultrasonic transmitter which is efficient in that multiple impact of the exciter with the vibrator rod is prevented, as compared to certain other forms of transmitters which have been previously used in the remote control of television receivers.

While particular embodiments of the invention have been shown and described, it will be obvious to those skilled in the art that changes and modifications may be

I claim:

1. A portable hand-held signal generator comprising: a support member; a vibrator rod mounted on said member; a mechanical exciter movable between an operative position where it is aligned with the axis of said rod and a second position where said exciter is displaced transversely from said axis; actuating means for moving said exciter between said operative position and said second position; spring means for biasing said exciter towards said rod in a direction parallel to said axis of said rod when said exciter is in said operative position; and means mounted on said support member for storing energy in said spring means when said exciter is in said second position and for releasing said energy to propel said exciter into impact with said rod when said exciter is in said operative position.

2. A portable hand-held signal generator comprising: a support member; a vibrator rod mounted on said member; a mechanical exciter movable between an operative position where it is aligned with the axis of said rod and a second position where said exciter is displaced transversely from said axis; actuating means for moving said exciter between said operative position and said second position; and means responsive to said transverse motion of said exciter to deflect said exciter into impact with said rod as said exciter reaches said operative position.

3. A signal generator according to claim 2 in which the actuating means for moving said exciter includes a carriage on which said exciter is movably mounted.

4. A signal generator according to claim 2 in which said deflecting means comprises a cam positioned adjacent the path of travel of said exciter for engaging and deflecting said exciter toward said rod as it approaches its operative position.

5. A signal generator according to claim 4 having a second cam for deflecting said exciter away from said rod as it leaves its operative position.

6. A signal generator according to claim 2 in which said actuating means moves said exciter in an arcuate path between said operative and second positions and comprises a trigger mechanism of the over-center type.

7. A signal generator according to claim 4 in which said actuating means moves said exciter in a linear path transverse to the axis of said rod.

8. A signal generator according to claim 7 having a guide channel extending between said operative and second positions with one wall of said channel apertured to provide access for exciter to an end face of said rod and with an opposite wall comprising said cam for deflecting said exciter through said aperture.

9. A signal generator according to claim 8 in which said opposite wall of said channel also includes a second cam for deflecting said exciter away from said aperture as said exciter leaves its operative position.

10. A signal generator according to claim 9 in which said exciter is carried on a pivoted support and in which said second cam deflects said exciter beyond the active surface of said first cam in a direction away from said rod.

11. A portable hand-held signal generator comprising: a vibrator rod; a mechanical exciter including a hammer supported for movement in a hollow guide and a spring biasing said hammer out of said guide; actuating means for moving said exciter with a component of motion transverse to said vibrator rod; and means responsive to said transverse motion of said exciter to impart to said exciter a component of motion in a direction parallel to said rod to propel said exciter into impact with said rod to set it into vibration, such means including a stop means which restrains movement of said hammer when said hammer is in a rest position but releases said hammer to the influence of said spring as said exciter attains an operative position in substantially coaxial alignment with said rod.

12. A signal generator according to claim 11 in which said hollow guide is pivotally supported for movement to present said hammer selectively to said rest and operative positions and which said stop means comprises members having a stop abutment located at said rest position and an aperture at said operative position for providing access for said hammer to an end face of said rod.

13. A portable hand-held signal generator comprising: a vibrator rod having a central axis and an face; a mechanical exciter movable between an operative position where it is aligned with the axis of said rod and a second position where said exciter is transversely displaced from said axis; actuating means for continuously moving said exciter in a path transverse to said axis and including said operative position and said second position; and means for urging said exciter toward said end face of said rod in a direction longitudinally of said axis and causing said exciter to impact said end face only when said exciter is in said operative position.

14. A portable handheld signal generator comprising: a vibrator rod having a central axis and an end face; a mechanical exciter movable into impact with said rod to initiate vibration thereof; actuating means for continuously moving said exciter in a path from a rest position where said exciter is transversely displaced from said axis through an operative position where it is aligned with said axis and to a third position where said exciter is transversely displaced from said axis; and means for urging said exciter toward said end face of said rod in a direction longitudinally of said axis and causing said exciter to impact said end face only when said exciter is in said operative position.

15. A portable hand-held signal generator comprising: a vibrator rod having a central axis and an end face; a mechanical exciter movable between an operative position where it is aligned with the axis of said rod and a second position where said exciter is transversely displaced from said axis; actuating means for continuously moving said exciter in a path transverse to said axis and including said operative position and said second position; means for urging said exciter toward said end face of said rod in a direction longitudinally of said axis; and means for preventing impact of said exciter with said rod except when said exciter is in said operative position.

16. A portable hand-held signal generator comprising: a vibrator rod having a central axis and an end face; a mechanical exciter having a rest position transversely displaced from said rod and longitudinally displaced from said end face; actuating means for continuously moving said rod in a path extending transversely of said axis from said rest position across an operative position in alignment with said end face; and means for causing said exciter to impact said end face at said operative position in said path.

17. A signal generator according to claim 16 in which said last mentioned means includes means for selectively imparting a longitudinal movement to said exciter in said operative position.

References Cited in the file of this patent

UNITED STATES PATENTS

| | | |
|---|---|---|
| 3,028,830 | Grundmann | Apr. 10, 1962 |
| 3,048,144 | Vistain | Aug. 7, 1962 |
| 3,054,380 | Sielaff | Sept. 18, 1962 |